Patented May 21, 1935

2,002,462

UNITED STATES PATENT OFFICE 2,002,462

WELDING ROD

Gorham W. Woods, Houston, Tex., assignor, by mesne assignments, to Haynes Stellite Company, Kokomo, Ind., a corporation of Indiana No Drawing. Application August 6, 1928, Serial No. 297,909

7 Claims. (Cl. 219—8)

My invention relates to the composition of welding rods which may be employed in welding a hard surfacing upon cutting tools and the like.

The invention is particularly adapted to the forming of a hard surfacing material, such as tungsten carbide, mixed with iron, into a rod from which it can be more easily melted and applied in welding thereafter.

In applying tungsten carbide and compounds containing tungsten carbide, and the like, difficulty is encountered in melting the carbide with the ordinary oxyacetylene blow torch, the heat generated is not great enough to easily melt the material. Also, the blow torch tends to blow the particles away before they can be melted. Due to the high temperature of fusion of the carbide, it is common to form the tungsten carbide or other hard materials, in small fragments and secure them in that form to the cutter by welding a layer of steel around the particles thus holding the particles in position. The welded material simply encloses the particles, retaining them in position, but with no bond between the weld and the hard particles. Thus when the welded material wears away the particles are loosened and may be lost out of the welded enclosing layer. Under high temperatures, the tungsten carbide may be fused and may alloy with the iron or steel, the alloy becoming a bond between the tungsten carbide and the steel of the blade. This can only be done, however, at high temperatures, not easily obtained with the ordinary blow torch. After the alloy is thus formed, however, its melting point thereafter is lower than that of tungsten carbide alone.

It is an object of my invention to provide a rod of convenient form made up of the carbide, alloyed with other metals or alloys, such as iron, iron and tungsten, or iron and chromium, which can be easily handled and applied with the ordinary blow torch.

I take small particles or fragments of tungsten carbide and the necessary amount of iron to make sufficient bulk and mix the same at a temperature high enough to partially fuse the tungsten carbide. Iron will be fused before the tungsten carbide starts to fuse, and I allow only the outer surface of the carbide fragments to fuse so as to form an alloy of the carbide with the iron over the surface of the carbide particles. The mass may be then poured into a mold to form a long rod ready for use.

As previously stated iron alone need not be used for the binder between the aggregate of tungsten carbide particles, but alloys of other metals such as iron and tungsten, or iron and chromium may be substituted.

A rod thus formed can be conveniently handled. The rod is placed against the blade to be faced and heated by a blow torch or similar means. The temperature of fusion of tungsten carbide need not be reached before the iron and the alloy of iron and the carbide will fuse and mix with the material of the blade and form a firm bond. As the alloy of iron and tungsten has "wet" the surface of the carbide particles, they will be held in place so that they cannot be lost out. The tungsten carbide before fusion is harder than when it is fused and alloyed with iron or the like. I thus get the full benefit of the hardness of the unfused particles, and yet am enabled to weld them, by means of the alloy coating which they have in the rod, in place and be assured that they will be held against removal.

The welding rod thus formed has the advantage that it can be easily handled and melted on the edge of a cutter with the ordinary acetylene torch.

Further, the particles of tungsten cannot be lost during welding or after welding. The force of the blow torch will not tend to blow the particles away before they can be fused, as sometimes happens. And the heat of the blow torch is sufficient to fuse the iron and the alloy even where the tungsten carbide is not affected. It will also enable the user to apply the hard material more expeditiously.

What I claim as new is:

1. A welding rod comprising an aggregate of small particles of tungsten carbide mixed with a binder of iron, said iron and carbide being alloyed together along the outer surfaces of said particles.

2. A welding rod of iron having mixed therewith particles of tungsten carbide, said carbide being bound to said iron by an alloy of iron and tungsten carbide.

3. A composite welding rod comprising particles of wear resistant material substantially uniformly distributed in and surface alloyed to a more readily fusible matrix material, said matrix material comprising a ferrous material or a ferrous alloy such as iron or steel.

4. A composite welding rod according to claim 3 in which said wear resistant material comprises a non-ferrous alloy such as tungsten carbide alloy.

5. A welding rod for depositing hard facing metal fragments on surfaces to be protected thereby, comprising a plurality of fragments of tungsten carbide bound together in the form of a welding rod by fused metal binder of ferrous material.

6. A welding rod comprising fragments of hard material having a relatively high melting point, and a metallic body of ferrous material bonding said fragments together.

7. A welding rod comprising fragments of tungsten carbide and a metallic body of ferrous material, bonding said fragments of tungsten carbide together and to said body of ferrous material.

GORHAM W. WOODS.